United States Patent Office 2,968,147
Patented Jan. 17, 1961

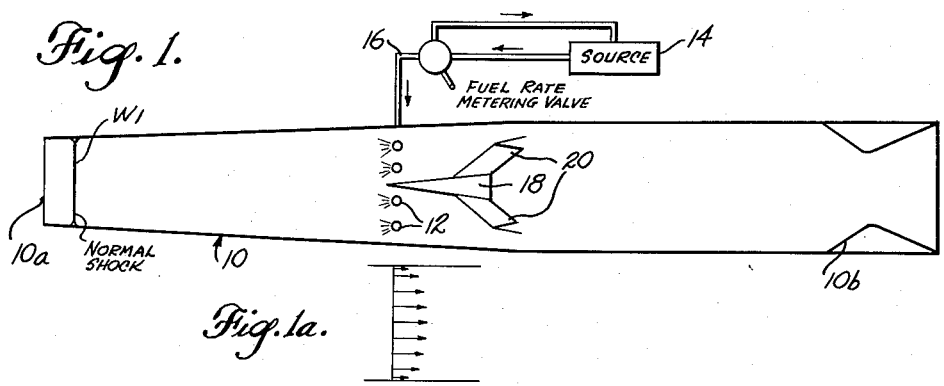
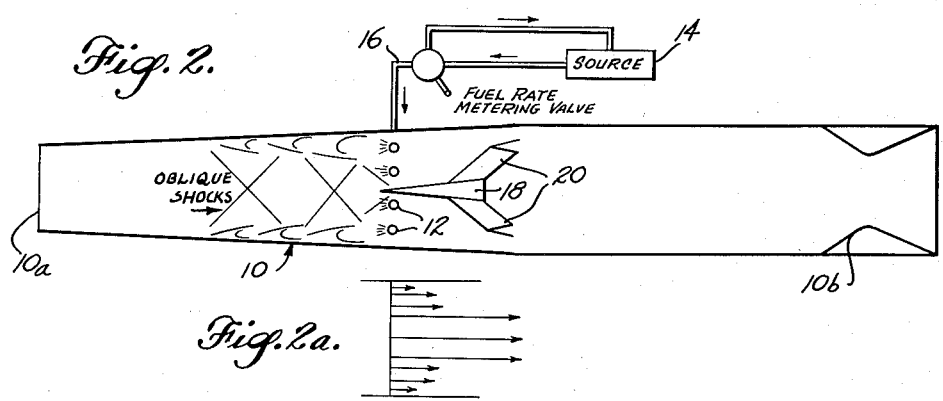
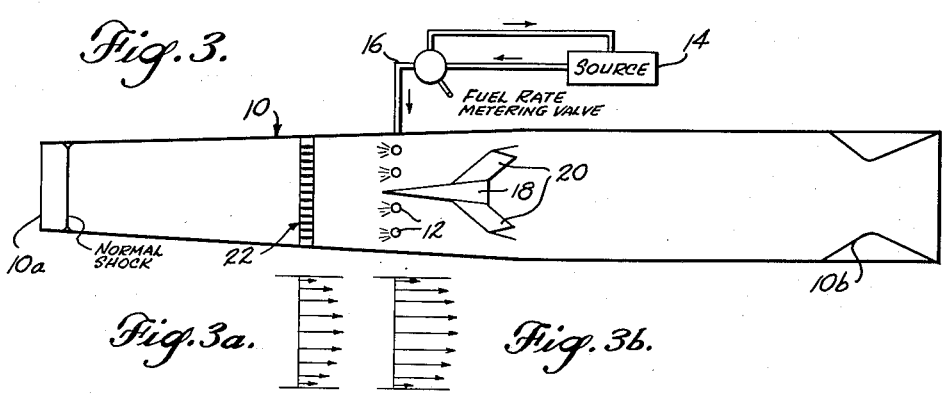

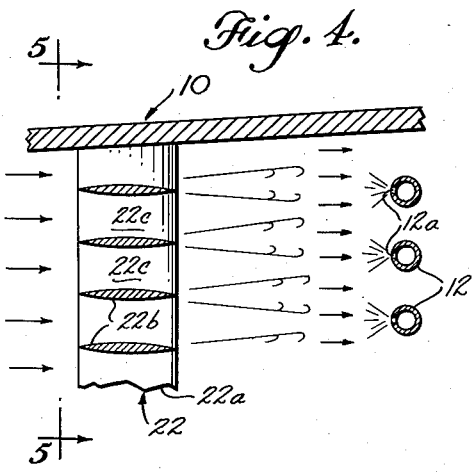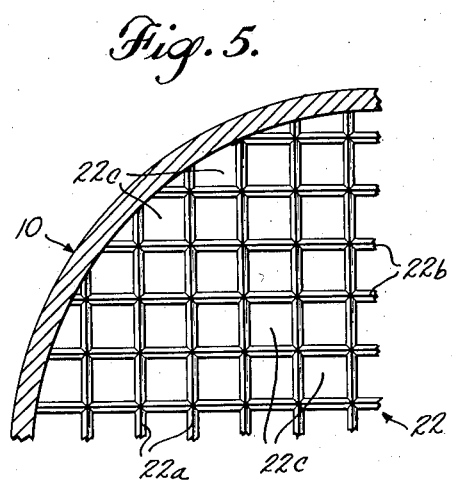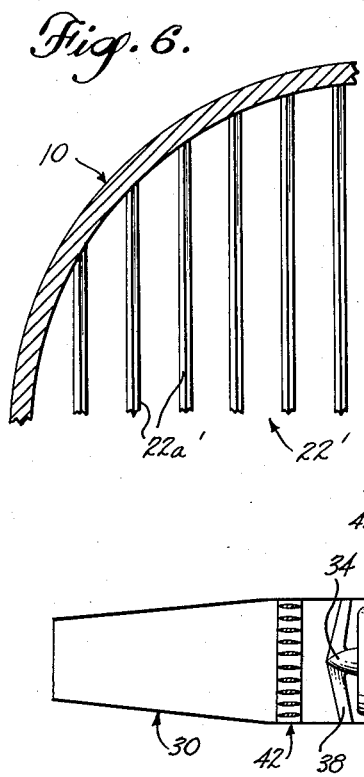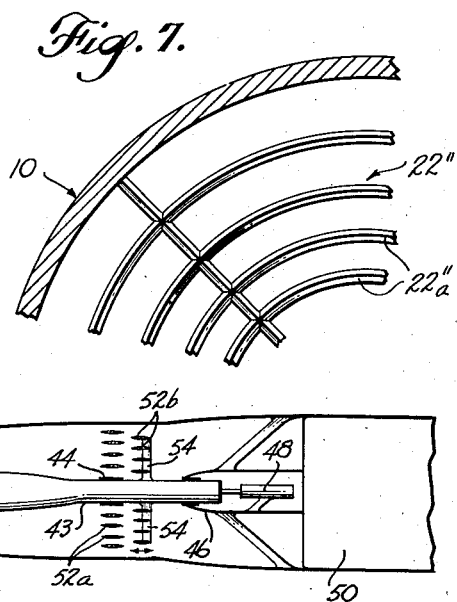

2,968,147

SUPERSONIC DIFFUSER WITH SHOCK POSITIONING MEANS

Richard H. Truly, Jr., Bellevue, Leonard P. Bonifaci, Mercer Island, and Bernard F. Beckelman, Kirkland, Wash., assignors to Boeing Airplane Company, Seattle, Wash., a corporation of Delaware Filed Apr. 23, 1957, Ser. No. 654,610

11 Claims. (Cl. 60—35.6)

This invention relates to improvements in supersonic diffusers, and more particularly to a novel means to control or modify air velocity profiles therein. The invention is herein illustratively described by reference to the presently preferred form thereof as applied to the control and preservation of fuel-to-air ratio profile and flame geometry in a ram-jet engine at supersonic speeds; however, it will be recognized that the specific form of the invention may vary and that the novel features thereof may be incorporated in supersonic flow diffusers for other applications as well.

Some other applications to which the invention is applicable include diffusers for turbojet engines and diffusers for ram air driven turbines or compressors. In the various applications of the invention it is important to control the velocity profile in the diffuser, particularly at the location of the means utilizing the subsonic airflow, such as a ram-jet burner or a turbine or compressor rotor. In the ram-jet application such velocity profile control is essential in order to achieve uniformity of the fuel-to-air mixture ratio, so as to provide efficient combustion, also in order to achieve and maintain optimum flame geometry.

A general object of the invention, therefore, is to provide an improved supersonic diffuser provided with means for controlling and stabilizing the velocity profile therein independently of variations in supersonic speed or of back pressure produced by the utilization device. More specifically it is an object of this invention to provide an effective shock positioning means in supersonic diffusers whereby any shock waves developed in the diffuser are shifted or confined chiefly to a relatively forward location therein and are thereby prevented from disturbing the velocity profile at a relatively downstream position therein such as the position of a ram-jet engine burner.

A related object is to provide such an improved supersonic diffuser wherein flow losses incurred directly by the shock positioning means incorporated in the diffuser are offset or more than offset by reduction in the energy losses otherwise resulting from shock waves therein. Such loss reductions are achieved principally by shifting or confining any residual shock waves in the diffuser to forward positions therein where Mach number is relatively low, so that energy-consuming pressure drops across the shock waves are correspondingly lower.

It is a further object of the invention to provide such an improved supersonic diffuser, especially for use in the ram-jet engine combination, effective to achieve the foregoing described purposes and objectives throughout a very wide if not virtually unlimited supersonic speed range above the speed condition of maximum thrust of the engine and throughout a wide range of burner-produced back pressures. A related object is to provide such a shock positioning means which minimizes energy loss in the speed range including and lying immediately below said maximum thrust speed condition, whereby engine efficiency, particularly at the critical maximum thrust condition, is maintained high. A more specific object is to provide a variable device permitting application of the invention to variable-geometry diffusers such as are used in modern turbojet engines.

A more specific object of the invention applied to ram-jet engines is to decrease greatly the usual operating sensitivity of such engines to flight speed, altitude, and outside interference effects such as may be caused by variations in angle of attack, etc.; that is, to increase the range of stable operation thereof in respect to any of the variables which normally have a profound effect on the stability and efficiency of the burner.

Another specific object is to provide a ram-jet engine having improved throttling characteristics, i.e., to permit the fuel-air ratio to be varied over a wider range without disturbing the stability of operation. In a conventional ram-jet engine, for example, a decrease in burner fuel-air ratio causes a rearward slip of the diffuser shock waves, hence disturbs the air velocity profile at the burner. With the improvement herein disclosed that cause of instability is largely eliminated, permitting a wider range of throttle control.

Still another object is to provide a device which may be adjusted or varied in its effect to permit application thereof to variable-geometry diffusers as in certain turbojet engines wherein the inlet or outlet openings, or both, are adjustable to maintain a high efficiency under different operating conditions.

Still another object is to provide a ram-jet engine which is improved in the further respects that actual flight conditions are more readily and accurately simulated in ground tests than heretofore by making the engine less sensitive to entrance conditions. Also for a similar reason actual flight conditions of the improved engine may be accurately simulated in scale model tests, whereas with conventional ram-jet engines this is not possible largely because the boundary layer conditions as they affect shock waves in a scale model differ considerably from those in the actual engine.

As a further important object, the invention acomplishes the described results in a highly simple manner and without need of moving or adjustable parts, complicated diffuser configurations, or such other undesirable expedients as a lengthened mixing section to isolate the burners from the shock wave termini, drag devices, boundary layer mixing devices, etc.

In accordance with this invention as herein disclosed there is placed across the diffuser interior preferably in each of mutually transverse directions, and at a location ahead of the region where a stably controlled velocity profile is required, a series of flow dividers which form relatively short flow passages therebetween. These short flow passages preferably have an aggregate open area or cross section bearing a predetermined relationship to the internal cross section of the diffuser entrance, whereby the flow through them is subsonic when the normal shock is at or just inside the diffuser entrance and becomes sonic when, during a further speed increase, the normal shock at the mouth of the diffuser recedes to a position incipient to the formation of an undesired lambda or oblique shock configuration. Such a grid arrangement of flow dividers creates a supersonic speed-proportional back pressure forwardly of its location which prevents further downstream movement of the shock system. Throughout the entire supersonic speed range above the critical point when flow becomes sonic through the described flow divider grid passages, therefore, increase of mass flow, while causing some increase of energy loss across the grid, produces an offsetting reduction of shock loss due to the forward shift of the shock system to where Mach number is lower because of rearward divergence of the diffuser, hence where any shock waves developed are of lower intensity. Preferably such flow dividers are of a streamlined form which presents minimum resistance to subsonic flow, so that in the speed range including and lying immediately below said critical point any energy losses incurred by the flow dividers will be negligible. Such a grid of flow dividers is herein termed a shock-positioning screen because of its unique function.

For application to variable-geometry engines the shock-positioning screen has a variable effective open area by which a predetermined relationship is maintained with the variable opening or openings of the engine diffuser.

These and other features, objects and advantages of the invention will become more fully evident from the description which follows based upon the accompanying drawing.

Figure 1 is a simplified longitudinal sectional view of a conventional ram-jet engine operated at near the maximum thrust condition, the view illustrating the presence of the normal shock wave attending such operation.

Figure 1a is a velocity profile diagram at the plane of the burner nozzles in Figure 1.

Figure 2 is a view similar to Figure 1 illustrating the shock waves during operation of the engine at a higher speed, and where less than maximum thrust is delivered by the engine.

Figure 2a is a velocity profile diagram at the plane of the burner nozzles in Figure 2.

Figure 3 is a view similar to Figure 1, but of a ram-jet engine incorporating the invention.

Figures 3a and 3b are velocity profile diagrams at the respective planes of the shock positioning screen and burner nozzles.

Figure 4 is an enlarged fragmentary longitudinal section of the engine of Figure 1 to illustrate the preferred form of shock-positioning screen or grid, and Figure 5 is a transverse sectional view on line 5—5 in Figure 4.

Figure 6 is a view similar to Figure 5, but of a modified form of grid.

Figure 7 is a view similar to Figure 5, but of a second modified form of grid.

Figure 8 is a simplified longitudinal sectional view of the invention as applied to a diffuser for a ram air driven turbine.

Figure 9 is a simplified longitudinal sectional view of the invention as applied to a variable-geometry turbojet engine, the shock-positioning screen being shown in one feasible adjustable form to vary its effective opening area in conjunction with diffuser inlet area variations.

Referring to Figures 1 and 2, the conventional ram-jet engine has a diffuser 10 which diverges rearwardly in cross section from its forward entrance 10a, and beyond its waist section rearwardly remains fairly constant in cross section to the location of the jet nozzle 10b at its aft end. It incorporates a plurality of burner nozzle pipes 12 extending at regular intervals in a transverse plane across its interior at a location just forward of the rear end of its rearwardly divergent forward section. These nozzle tubes have nozzle openings 12a therein by which fuel is ejected in the direction against air flow in a uniformly distributed pattern conducive to uniform distribution of fuel throughout the entire cross section of the duct interior. Such fuel is delivered to the nozzle tubes from a suitable source 14 through duct means 16 in which a flow metering valve may be incorporated for purposes of throttle or regulatory control. The usual generally conical island member 18 is mounted by radial vanes or struts 20 coaxially of the duct just behind the burner nozzles.

As such an engine travels at supersonic speed a normal shock wave W1 is formed in the diffuser. When this shock wave is formed at or near the diffuser entrance, the engine is operating at or near maximum thrust. Under these conditions, as shown in Figure 1a, the air velocity profile in the plane of the burner nozzles is fairly constant, resulting in a substantially uniform mixture of air and fuel and a favorable flame geometry in the burner section between the jet nozzle 10b and fuel nozzle plane. Under this restricted condition, minor increases or decreases of speed of the engine relative to the free air mass or minor changes in the fuel injection rate do not disturb this pattern and the engine operates stably and efficiently.

However, if the conventional ram-jet engine operates at much higher speed than under the condition represented in Figure 1, the deceleration-induced shock occurs downstream where the boundary layer is thicker and the Mach number is relatively high. Now the shock configuration takes the form of a series of intense lambda shocks or oblique shocks, probably accompanied by some backflow at the walls, as depicted in Figure 2. The location of initial deceleration at which shock first occurs moves downstream in the diffuser as flight speed is increased. This marked change in the nature of the flow in the decelerating region as a function of material changes in speed above the value represented by the conditions depicted in Figure 1 creates serious problems fundamental to the stability of operation of the conventional ram-jet engine. These problems are primarily due to the adverse effect on velocity profile across the duct interior. In Figure 2a the velocity in the central region is much greater than in intermediate regions between the center and the walls of the diffuser. This high degree of nonuniformity in the rate of air flow creates a corresponding nonuniformity of the fuel-to-air mixture ratio in the burner section and causes a great disturbance in the flame geometry, often resulting in loss of operation and at least in great inefficiency. For these reasons the conventional ram-jet engine is not inherently stable throughout a wide range of supersonic speeds or ambient entrance conditions, and cannot be readily controlled by a throttle over a wide supersonic speed range.

The present invention has been demonstrated as a highly effective and desirable means for overcoming this problem and of achieving generally the objectives set forth hereinabove. Referring to Figures 3 to 5, inclusive, the improved engine diffuser includes a shock-positioning screen or grid 22 comprising one series of parallel stream divider strips 22a transversely intersecting a second and similar series of parallel strips 22b. The individual strips are long and relatively narrow in cross section and are disposed with their wide dimension parallel to the length of the engine. These strips taper in thickness from their longitudinal mid-line toward their opposite side edges so as to present an efficient streamlined configuration for subsonic flow of air through the generally rectangular openings 22c formed by the grid. In that form the grid presents minimum drag effect at the critical maximum thrust condition.

The spacings between strips in each series in this preferred embodiment are equal and uniform across the full width of the duct interior. This spacing interval between successively adjacent strips determines the minimum distance forwardly of the plane of the burner nozzles at which the grid should be placed in order to insure that the individual small jets comprising the wake of the grid will be mixed together and merged into a unitary flow mass with substantially uniform velocity profile before reaching the plane of the burner nozzles where uniformity of flow is important. This required minimum distance of separation between the burner section and the grid to achieve that result is proportional to the grid spacing intervals. Therefore, in order to minimize this separation distance, and thereby minimize the engine length, the width of the grid openings should be made small.

The ratio of the total grid open area to the area of the diffuser entrance is also an important design consideration. This ratio should be such that for the design Mach number, flow through the grid is subsonic when the normal shock is at or slightly inside the duct inlet. The ratio is substantially optimum, in theory at least, when the flow through the individual grid openings just becomes sonic when, during a decrease in burner pressure caused by a decrease in fuel-air ratio, or increase in engine speed, the normal shock advances to a position incipient to formation of an undesirable shock configuration such as the system of oblique shock waves similar to that depicted in Figure 2. By satisfying this requirement, further downstream shifting of the shock system with further decrease in burner pressure is prevented. If the total open area of the grid is increased much above that giving the optimum area ratio as aforesaid, the grid loses some of its effectiveness to prevent formation and rearward shift of an undesired shock system. On the other hand, if the total open area of the grid is decreased much below that giving said optimum area ratio, the normal shock will not be established in the diffuser at all, and high spillage losses will occur at the entrance to the diffuser.

It will be noted in Figure 3 that the normal shock wave is restored to forward part of the diffuser at relatively high supersonic speed because of the presence of the grid 22.

It will be recognized, of course, that due to the approximations, and to some extent, due to the assumptions, required in dealing with supersonic flow problems, together with the effect of differences of boundary layers with different diffuser configurations, it is practically necessary that much of the final determinations of optimum relationships in particular designs be left to trial and error methods of approach. In all cases, however, the above described considerations and principles serve to establish the requirements and indicate the nature and effect of corrections to be made in achieving final designs on the basis of tests with preliminary designs.

It should be noted that the effect of the grid or screen device 22 of this invention in supersonic flow diffusers is not primarily that of honeycomb grids or screens heretofore used in subsonic wind tunnels or other subsonic flow ducts. The common screens or grids or like devices improve velocity profiles in ducts by constricting the flow and creating turbulence at and immediately downstream of the screen. However, in the present invention the all important purpose of the grid or screen is to create a back pressure which has the effect of shifting or confining to the forward portion of the diffuser any undesired shock waves which may tend to form which would otherwise greatly disturb the velocity profile at the burner. This deliberately created pressure drop formed by observing certain design criteria as previously set forth does not produce a corresponding energy loss, however. As already explained, the net loss is negligible and in some cases there may be an actual net gain due to the decreased rearward shift of the shock system. But more significant than the aerodynamic efficiency factor is the resulting great improvement in performance characteristics of the resultant ram-jet engine.

In Figure 6 the modified shock positioning grid 22' is composed of a single series of parallel flow divider strips 22a' extending transversely across the diffuser interior forwardly of the burner section as in the embodiment previously described. In Figure 7, the strips 22a'' of screen 22'' are circular in form and of graduated diameters. These circular strips are arranged concentrically in a common plane as in the preceding embodiments. In both of these modified forms of the invention the effect of the respective grids is generally similar to that in the first described embodiment, namely to create a back pressure ahead of the grid which increases progressively with supersonic speed and which influences the positioning of the shock system as before. The design principles already set forth also apply to these modified grids.

In most cases it will be found that the spacings between the flow divider strips should be approximately uniform and constant. In certain applications, however, graduated spacings may be employed to achieve additional effects, particularly wherein variable pressure profiles are required at the utilization device, i.e. burner, compressor, turbine, etc. In Figure 7, the circular strips or rings are spaced more closely together near the center of the diffuser duct than they are near the wall. While the back pressure profile across the diffuser interior immediately upstream from the screen will be substantially uniform so that the shock-positioning effect will be substantially the same as with a uniform screen element spacing, the effect of the variable spacing will be to modify downstream pressure profile as may be required in order to satisfy any special pressure requirements of different utilization devices.

Figure 8 illustrates the principle of the shock-positioning grid applied to a supersonic diffuser 30 in which a ram air driven compressor 32 is mounted. The compressor rotor is journaled in bearing units 34 and 36 centrally supported by sets of radial arms or struts 38 and 40, respectively. The shock-positioning screen 42 may be generally similar to that shown in Figure 5, for example, and is disposed transversely of the diffuser, spaced forwardly of the compressor 32 preferably by a distance corresponding to that employed in the embodiment just described. As in the previous instance, the objective here is to prevent the formation or spreading of a shock system downstream from the diffuser entrance region. Instead of preventing burner disturbances as in the ramjet application, the purpose of the grid here is to prevent compressor surge and blade vibration by preventing uneven velocity profiles and unstable flow at the compressor.

While the invention has been illustrated in conjunction with diffusers of fixed form, it will be recognized that it may also be applied to variable geometry diffusers if the inlet of the diffuser cannot be matched to the engine or other air-operated device within the diffuser.

The specific form of the diffuser duct is not confined to circular cross-sections as shown, but may equally well be of annular, rectangular, or transitional geometry.

In Figure 9 there is shown a modification of the invention illustrating the principle of the shock-positioning screen as effectively applied to a variable-geometry engine. In some applications of the invention, as in this particular embodiment, it may be desirable to provide a shock-positioning screen having a variable area opening produced by varying the width of the screen bars or, as herein, by other suitable devices such as the use of interdigitated sets of bars which move together and apart relatively in order to vary the effective composite screen opening. The illustration is of a variable-geometry turbojet engine comprising a diffuser 40 in the throat of which is mounted, for axial movement, an inlet cone 42, by which the inlet area of the engine may be varied in order to attain high efficiency under a wide range of operating conditions. This cone is supported on a shaft 43 centrally within the diffuser. The shaft 43 extends rearwardly from the base of the cone and is guided in a slide collar 44 to move lengthwise. The collar 44 is supported by certain of the grid bars 52a which are intercepted by it. A turbo unit journal housing 46 slidably supports the rear end of shaft 43 to permit longitudinal movement of the cone. Suitable actuating means are provided for effecting such movement, such as the hydraulic jack 48 mounted within the same housing. The housing may also serve as a forward support for the turbo unit 50.

Forwardly of the turbo unit 50 and rearwardly of the throat of the diffuser is mounted a variable-opening composite screen 52. In its illustrated form this screen comprises a grid of parallel bars 52a of streamlined form in cross-section and of appreciable thickness. As previously mentioned certain of these bars support the guide collar 44. A second grid of bars 52b of similar form is located behind the grid of bars 52a. The bars 52b are carried by struts 54 mounted on the shaft 44 to move axially with the shaft and with the cone 42. The bars 52b are offset from the bars 52a so that forward movement of the former advances them into or approaching interdigitated or overlapping relationship with the latter and thereby reduces the effective total opening through the composite screen comprising the two grids. Thus as the diffuser entrance opening is increased or decreased so is the effective screen opening by an amount depending on the proximity or degree of overlap of the bars of the respective grids. By this means it is possible to maintain substantially optimum relationship between the engine inlet and shock-positioning screen openings under different operating conditions as desired for most efficient use of the invention in that type of engine.

One advantage of employing the shock-positioning means of this invention in a turbojet engine, for example, is the overcoming of compressor blade vibration due to oblique shock waves which may otherwise develop in the diffuser at the compressor location under certain conditions. Increased engine efficiency is, of course, another advantage.

It will be recognized that variable-geometry engines are of different types and that in some instances a tail cone is moved or both a tail cone and an inlet cone. In any case it is readily possible by this invention to vary the shock-positioning screen in accordance with or in automatic coordination with the engine elements. A variable-opening shock-positioning screen may also be employed in still other types of supersonic jet engines, if desired.

The foregoing description and accompanying illustrations, therefore, serve as examples showing the preferred embodiments of the invention. However, it will be recognized that the novel principles involve extend to various applications and may be practiced in varying and modified forms.

We claim as our invention:

1. In a supersonic ram jet engine, in combination with a supersonic diffuser having a utilizer therein and subject to the formation of undesired oblique shock waves thereing which tend to extend and spread rearwardly from the diffuser entrance progressively with increase of relative supersonic speed between the diffuser and the outside free air mass or with reduction in utilizer-produced back pressure, means mounted inside said diffuser, said means having its forward portion spaced rearwardly from the entrance of the diffuser and forwardly of said utilizer to prevent such rearward extent and spread of shock waves, said means comprising a plurality of stream divider elements mounted in said diffuser to form a grid extending generally transversely across the diffuser interior, said grid being adapated to produce a back pressure ahead of the same which increases progressively with diffuser speed and which thereby prevents rearward movement of the shock system in the diffuser, the net composite open area of the grid to air flow therethrough bearing a predetermined relationship to the diffuser inlet cross-sectional area, such that during an increase of supersonic speed of the diffuser, air flow through the grid becomes sonic substantially as the normal shock in the diffuser advances rearwardly to a position incipient to formation of undesired oblique shock waves therein.

2. The combination defined in claim 1, wherein the stream divider elements are of streamlined form with respect to subsonic flow of air past the same.

3. The combination defined in claim 1 wherein the stream divider elements comprise a plurality of elongated strips disposed in substantially parallel relationship across the diffuser interior.

4. The combination defined in claim 1 wherein the stream divider elements comprise two sets of elongated mutually parallel strips, the strips of one set being disposed at an angle to the strips of the other set and substantially in the same plane as the latter.

5. In a supersonic ram jet engine, in combination with a supersonic diffuser having a utilizer therein and subject to the formation of undesired oblique shock waves therein which tend to extend and spread rearwardly from the diffuser entrance progressively with increase of relative supersonic speed between the diffuser and the outside free air mass or with reduction in utilizer-produced back pressure, means mounted inside said diffuser, said means having its forward portion spaced rearwardly from the entrance of the diffuser and forwardly of said utilizer to prevent such rearward extent and spread of shock waves, said means comprising a plurality of stream divider elements mounted in said diffuser to form a grid extending generally transversely across the diffuser interior, said grid being adapted to produce a back pressure ahead of the same which increases progressively with diffuser speed and which thereby prevents rearward movement of the shock system in the diffuser, said diffuser comprising a variable geometry diffuser having means to vary the opening of a terminus thereof, and said means comprising the stream divider elements including means operable to vary the effective total open area through which air may flow between said stream divider elements.

6. The combination defined in claim 5, and means operatively interconnecting the means to vary the diffuser terminus opening and the means to vary the effective open area between stream divider elements, said interconnecting means causing substantially simultaneous variation of such open area and such opening, thereby to maintain a predetermined relationship therebetween.

7. The combination defined in claim 5, wherein the means to vary the diffuser terminus opening comprises a movable diffuser entrance control element, and means coordinatively interconnecting the means to vary the effective open area between the stream divider elements and said entrance control element, whereby said latter area is decreased with decrease of diffuser entrance area by movement of said control element.

8. In a supersonic ram-jet engine, the combination comprising an elongated diffuser having an entrance and having a burner section including fuel injection means spaced rearwardly therein from said entrance, and a grid structure disposed transversely of the diffuser interior at an intermediate location between said entrance and said burner section, said grid structure including a plurality of flow divider elements transversely separated to permit air flow therethrough, and producing a pressure drop preventing rearward extent and spread of undesired oblique shock waves from the diffuser entrance accompanying increase of supersonic speed of the engine relative to the free air mass, or decrease in burner back pressure, the net total open area of the grid to air flow therethrough bearing a predetermined relationship to the diffuser inlet cross-sectional area such that during an increase of supersonic speed of the diffuser, air flow through the grid becomes sonic substantially as the normal shock in the diffuser advances rearwardly to a position incipient to formation of undesired oblique shock waves therein.

9. The ram-jet engine defined in claim 8, wherein the stream divider elements are of streamlined form with respect to subsonic flow of air past the same.

10. The ram-jet engine defined in claim 9, wherein the stream divider elements comprise a plurality of elongated strips disposed in substantially parallel relationship across the diffuser interior.

11. The ram-jet engine defined in claim 9, wherein the stream divider elements comprise two sets of elongated mutually parallel strips, the strips of one set being disposed at an angle to the strips of the other set and substantially in the same plane as the latter.

(References on following page)

References Cited in the file of this patent

UNITED STATES PATENTS

| | | |
|---|---|---|
| 2,435,990 | Weiler | Feb. 17, 1948 |
| 2,625,010 | Clark | Jan. 13, 1953 |
| 2,663,993 | Mosser | Dec. 29, 1953 |
| 2,763,426 | Erwin | Sept. 18, 1956 |
| 2,772,620 | Ferri | Dec. 4, 1956 |

FOREIGN PATENTS

| | | |
|---|---|---|
| 648,878 | Germany | Aug. 11, 1937 |
| 140,860 | Sweden | June 16, 1953 |